May 24, 1966  J. V. ATANASOFF ETAL  3,252,429
SORTATION CARRIER VEHICLE
Filed July 20, 1964  2 Sheets-Sheet 1
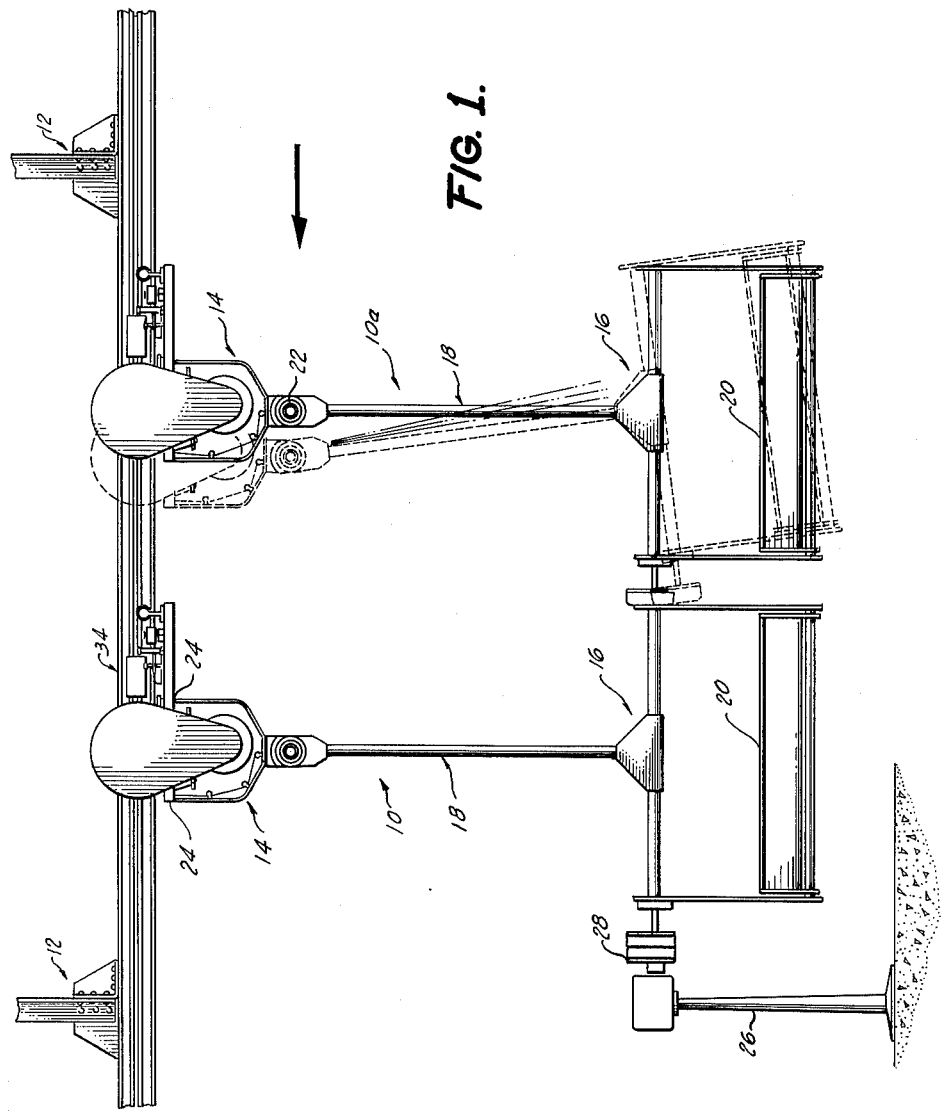
INVENTORS
JOHN V. ATANASOFF
WILLIAM G. SWANSEN
By *William J. Newman*
ATTORNEY

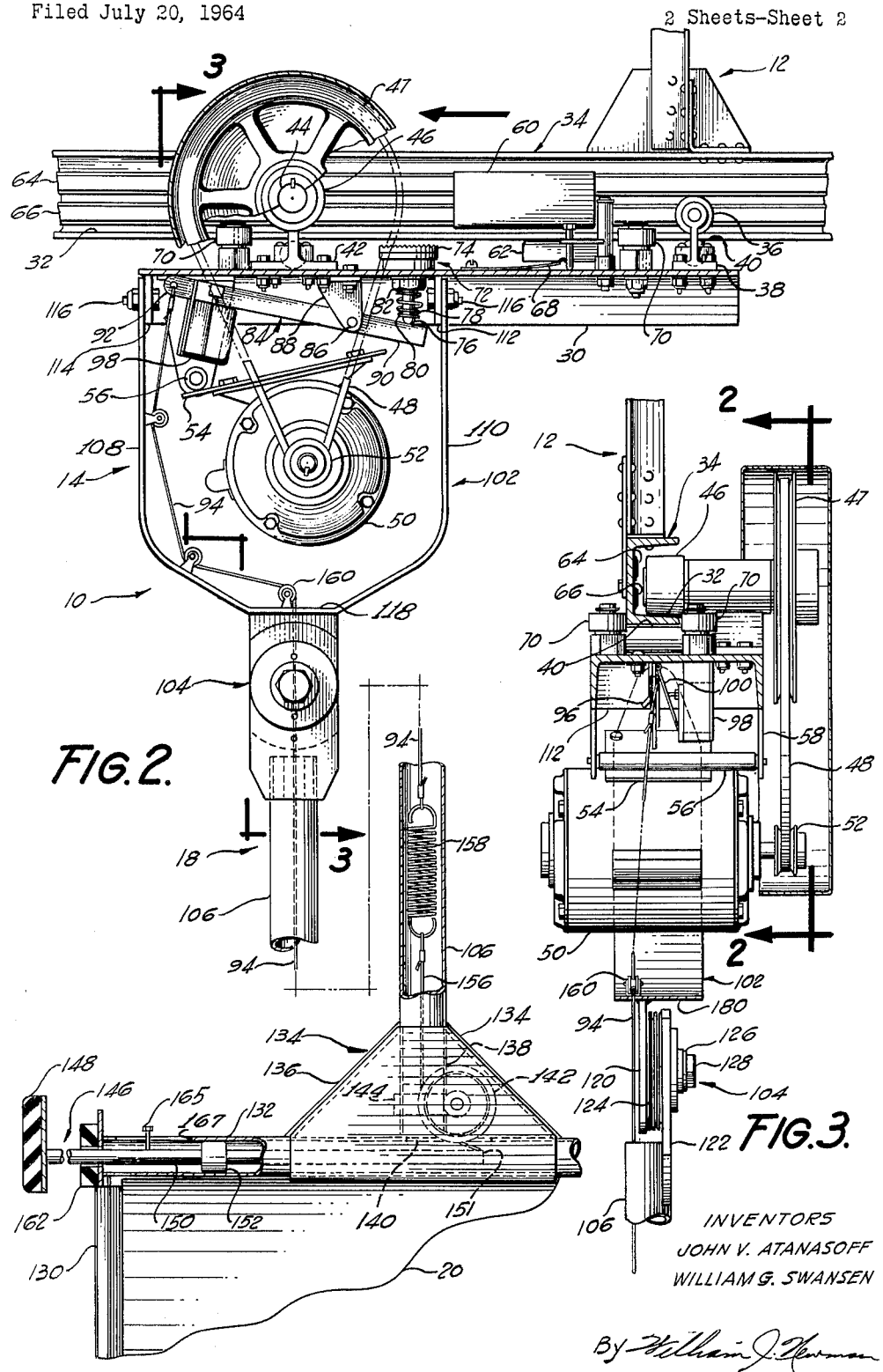

3,252,429
SORTATION CARRIER VEHICLE
John V. Atanasoff, P.O. Box 503, Frederick, Md., and William G. Swansen, 2514 Keystone Ave., North Riverside, Ill.
Filed July 20, 1964, Ser. No. 383,870
13 Claims. (Cl. 105—150)

This invention relates to sortation systems and more particularly to carrier vehicles for sortation systems of the overhead suspended rail type such as described in the copending application of John V. Atanasoff and Robert C. Gathers, Serial No. 251,427, filed January 14, 1963.

The carrier vehicle in a sortation system of this type is self-powered and performs the dual function of sorting and transporting objects loaded thereon. That is, objects are loaded onto the vehicle at any point along the system and, by means of a code inserted into a memory mechanism carried by the vehicle, the object is transported to the desired destination located at any desired point along the system.

This type of sortation system is advantageously adaptable for use in the sortation of sacks of mail passing through railroad terminal facilities wherein sacks of mail arriving at the terminal from incoming trains, trucks, conveyors, etc., are routed to outgoing means of transportation. Suspended rails are installed adjacent the desired railroad sidings, as well as other locations in and around the rail terminal, so that carrier vehicles suspended therefrom may carry mail sacks directly from the incoming transportation means to the outgoing transportation means.

A system of this type has a very high capacity in comparison to conveyor types presently used because it is not necessary to route all of the mail sacks through a central facility such as a conveyor belt. Since each carrier vehicle generally carries only one sack of mail, maximum efficiency dictates the use of a large number of carrier vehicles operating at high speeds and running at close intervals along the rails.

It is, therefore, an object of this invention to provide a carrier vehicle for a sortation system of the type described.

It is also an object of this invention to provide a carrier vehicle which may be used in a high speed, high volume system such as required for mail sortation in railroad terminal facilities.

Another object of this invention is to provide a braking mechanism for arresting the forward travel of a carrier vehicle.

Other objects and advantages of this invention will be readily understood upon a further reading of this specification especially when taken in view of the accompanying drawings, in which:

FIG. 1 is an elevation view of two carrier vehicles suspended from the carrier rail system;

FIG. 2 is an elevation view, partially in section along line 2—2 of FIG. 3, showing in detail the driver assembly with a portion of the carrier assembly and disclosing the elements of the braking system; and FIG. 3 is an elevation of the front of the driver assembly of the carrier vehicle taken along the lines 3—3 of FIG. 2.

Referring now to FIG. 1 there is shown a pair of carrier vehicles 10 and 10a suspended from a rail system 12 for transport therealong. Each carrier vehicle 10 comprises a driver assembly 14 with a carrier assembly 16 suspended by a support member 18. The carrier assembly 16 is adapted to carry mail sacks or the like in a tray 20.

It may be seen that a mail sack, which may weigh 150 lbs. or more, in the tray 20 causes the concentration of mass to be at a substantial distance below the rail 12. Thus, the inertia from the low center of mass as the carrier vehicle accelerates or decelerates will have a tendency to cause the driver assembly 14 to rock to and fro with respect to the rail 12. To reduce this effect the support member 18 is pivotally mounted at 22 to the driver assembly 14 as will be described hereinafter.

The low concentration of mass also causes lateral forces on the driver assembly due to centrifugal force as the carrier vehicle proceeds along curved sections of the rail 12, thus producing a tendency to rock laterally with respect to the rail. To minimize this effect the carrier assembly is pivotally supported at 24 from the driver assembly as will be described hereinafter.

Provisions must be made, of course, to stop the carrier vehicles at selected spots along the conveyor system. A stopping mechanism 26 having an arm 28 insertable into the path of travel is used to arrest the forward motion of the carrier vehicle. The carrier vehicle is adapted to stop responsive to engagement with the arm 28. It is desirable, however, that the vehicle stop in a position with respect to the stopping means so that the carrier assembly 16 is hanging from the driver assembly in a natural state as shown by the carrier vehicle 10 in FIG. 1. Package loading becomes difficult if the carrier vehicle stops so that the carrrier assembly is in a tilted position such as shown by the dotted position of carrier 10a in FIG. 1. The carrier vehicle of this invention is designed so that the momentum of both the carrier assembly 16 and the driver assembly 14 will be arrested in the same distance of travel subsequent to the carrier assembly 16 engaging the stopping mechanism 26.

In detail the carrier vehicle 10, as may be seen in FIGS. 2 and 3, comprises a base member 30 formed of an inverted section of channel beam. The back end of the base member is supported from the lower flange 32 of the channel beam forming the rail 34 by means of a wheel 36 journaled in a shaft support 38 on the top of the base 30. A roller 40 is also rotatably journaled at the back end of the base member for engagement with the underside of the flange 32 on the rail 34.

Toward the front of the base member 30 a shaft support 42, bolted to the base, journals a shaft 44 carrying a drive wheel 46 in friction engagement with the upper surface of the flange 32 on the rail 34. The other end of the shaft 44 has keyed thereto a pulley 47 which is driven by a belt 48 from a motor 50 and pulley 52.

The motor 50 is bolted to a plate 54 which is pivotally supported at 56 by lugs 58 depending from the bottom of the base member 30. Thus the weight of the motor 50 maintains the belt 48 taut eliminating need for any idler pulleys.

The motor 50 preferably is a 3-phase synchronous type so that all carrier vehicles in the system will operate at the same speed. Electric power for the motor 50 is derived from brush assemblies 60 and 62 attached to the top of the base member 30. Brush assembly 60 carries two brushes (not shown) which engage two bus bars 64 and 66 mounted to and insulated from the channel rail 34. The brush assembly 62 engages the bottom of the rail 34 for the third phase and is maintained in resilient engagement therewith by a spring 68.

Four guide wheels 70 are attached to the top of the base member 30, two each of either side of the rail 34. The guide wheels 70 maintains the carrier vehicle from slipping off the rail as well as provide proper tracking around the curves.

The drive assembly 14 has a brake assembly including a shoe 72 with a brake pad 74 and a spindle 76 extending through an aperture in the base member 30 so as to be vertically translatable to cause the pad 74 to engage the bottom of the rail 34. The pad 74 is maintained out of engagement with the rail by means of a bias spring 78 extending between a stop 80 at the end of the spindle 76 and a bushing 82. There is a lever 84 pivotally supported at 86 by lugs 88 depending from the bottom of the base member 30. The short end 90 of the lever arm workingly engages the end of the spindle 76 of the brake shoe 72 while the longer end 92 is operatively connected by a cable 94 to actuating means in the carrier assembly 16 as hereinafter described. A guide 96 (FIG. 3) is provided for the operating end 92 of the lever and the throw arm 100 of a limit switch 98 is biased against the guide 92 so as to be actuatable by the lever. The switch 98 is included in the circuit for energizing the motor 50 so that when the lever arm 84 is in the upward position as shown in FIG. 2 power is supplied to the motor, and when the lever is pulled downward by the cable 94 out of engagement with the throw arm 100 of the switch, power is disconnected from the motor. With this arrangement the motor is deenergized whenever the brake shoe 72 is in braking engagement with the rail 34.

The carriage assembly 16 is pivotally suspended from the drive assembly 14 by means of a support member 18 including a U-shaped bracket 102, a pivot and damper mechanism 104 and a tubular member 106. Shoulder bolts and nuts 116 pivotally connect the U-shaped bracket 102 at the ends of its legs 108 and 110 to transverse plate members 112 and 114 attached to the bottom of the base 30 of the driver assembly.

The pivot and damper mechanism 104 has a first bracket member fastened to the bottom 118 of the U-shaped bracket 102 and a second bracket member 122 fastened to the tubular member 106 (FIG. 3). The damper assembly also includes friction clutch plates 124, shaft means 126, bolt 128, etc., assembled in accordance with the disclosure in copending application Serial No. 225,985, filed September 25, 1962, now Patent No. 3,168,874. The shaft means 126 forms the pivot axis 22 about which the carrier assembly 16 is pivotable in a plane along the line of travel of the carrier vehicle. As described in the aforementioned application, the assembly 104 eliminates undue oscillations of the carrier assembly 16 as the vehicle proceeds along the track and the degree of dampening varies in relation to the weight of the object being carried thereby.

The carrier assembly 16 comprises the bag carrying tray 20 supported by a frame 130, the upper portion of which is formed by a tubular bar 132. The tubular bar 132 is attached centrally thereof to the tubular member 106 and the joint is structurally reenforced by two triangular braces 134 and 136. The rear of the tubular member 106 and the top of the tubular bar 132 have slots 138 and 140 respectively to provide access for a pulley 142 mounted for rotation therewithin by a bracket 144.

A plunger member 146 has a shaft 150 extending into the front end of the tubular bar 132 with the rearward end 151 terminating at a point beyond the pulley 142. The shaft 150 is journaled for axial translation within the tubular bar 132 by a plurality of bushings 152. The forward extending end of the shaft 150 carries a bumper 148, preferably fabricated of a resilient material such as rubber to absorb some of the shock when it engages an obstacle. A shock bumper 162 is also provided at the forward end of tube 132 to absorb shock from the inwardly traveling plunger 148.

The end 151 of the plunger is interconnected with the working arm 92 of lever 84 of the driver assembly brake mechanism by cables 94 and 156 and coil spring 158. Cable 156 extends from the end 151 of shaft 150 around pulley 142 to the end of spring 158, while cable 158, passing about rollers 160, link the other end of the spring 158 with the lever arm 92. The spring 158 normally maintains the plunger member in extended position in front of the carrier assembly. A screw 165 threaded into tube 132 has its end extending into a slot 167 in plunger shaft 150 for defining the limits of travel of the plunger.

When the vehicle approaches a stopping point along the system so that the plunger 148 hits a stopper mechanism 26, or perhaps the back of another carrier vehicle, the plunger shaft 150 is axially displaced with respect to the tubular bar 132 pulling on cable 94 to extend the spring 158. Thus the kinetic energy of the carrier assembly 16 is absorbed in the extended spring 158.

As the spring is extended tension is also applied to cable 94 so as to pull on lever 84, thus operating the brake shoe 72. The brake shoe stops the driver assembly 14 and its kinetic energy is dissipated in the form of heat. The spring 158 is selected such that when it is extended a distance equal to the predetermined extended length of the plunger, the energy absorbed therein is equal to the kinetic energy of the carrier assembly at the time of impact. That is, assuming that the plunger 148 is normally extended 6 inches in front of the carrier assembly, the kinetic energy of the carrier assembly 16 will be completely absorbed by extending the spring 158 six inches.

The ratio of the lever 84 and the brake pad 74 on the brake shoe are selected so that the driver assembly 14 also stops within the preselected distance, i.e., 6 inches of brake lining travel. Therefore, the driver assembly 14 comes to rest at the same time as the carrier assembly 16 and there is no tilting of the carrier assembly. Power to the motor is also cut off by the lever arm interacting with the limit switch 98.

The spring 158 is preferably chosen to stop a vehicle having an empty carrier assembly. After the vehicle has come to a stop the spring 158 tends to restore itself to its original shape pushing the plunger out and the carrier assembly away from the stopper mechanism so that it has a forward tilt. If the spring is chosen with regard to the empty carrier, the weight of the carrier assembly will keep the plunger from moving out after stopping. If, however, the spring were chosen to stop a carrier having a full load of say 135 lbs. or more, the spring necessarily would be quite stiff. Its return force would, therefore, be great enought to return the plunger to its extended position and cause the empty carrier assembly to assume a tilting position. It is desirable that an empty carrier vehicle be more nearly horizontal than a full one when in an "at rest" condition for loading ease.

When the vehicle is carrying a mail sack of considerable weight there will of course be more energy in the carrier assembly when moving because of the increased mass. Hence, more than the extended distance of plunger travel and spring extension are required to stop it. To compensate for this the plunger bumper 148 and the shock bumper 162 are fabricated of rubber so as to absorb at least a substantial portion of the excess energy.

While there has been described one embodiment of the invention it is to be understood that many modifications may be made thereto without departing from the basic teachings herein. It is, therefore, intended to be bound only by the accompanying claims.

What is claimed is:

1. A vehicle for a suspended rail conveyor system comprising a driver assembly, a carrier assembly pivotally suspended from said driver assembly to permit swinging along the line of travel of said vehicle, a brake shoe mounted on said driver assembly for engagement with said rail, means for operating said brake shoe, a tube horizontally mounted on said carrier assembly in alignment with the line of travel of said vehicle, a plunger slidably journaled within said tube having one end terminating within said tube and the other end terminating forward of said carrier assembly for engagement with obstacles in the path of travel of said vehicle, a helical spring, a cable connected between one end of said spring and said one end of said plunger, a second cable connected between the other end of said spring and said brake shoe operating means, said spring biasing said plunger to an extended position forward of said carrier, whereby impact of said plunger with an obstacle in the course of travel simultaneously causes said brake shoe to stop said driver assembly and said spring to absorb energy of the forward motion of said carrier assembly.

2. A vehicle for a suspended rail conveyor system comprising a driver assembly, a brake shoe mounted on said driver assembly for engagement with said rail, means for operating said brake shoe, a carrier assembly pivotally suspended from said driver assembly to permit swinging along the line of travel of said vehicle, a plunger slidably journaled on said carrier assembly having one end terminating forward of said carrier assembly for engagement with obstacles in the path of travel of said vehicle, a helical spring, a cable connected between one end of said spring and the other end of said plunger, a second cable connected between the other end of said spring and said brake shoe operating means, said spring biasing said plunger to an extended position forward of said carrier, whereby impact of said plunger with an obstacle in the course of travel simultaneously causes said brake shoe to stop said driver assembly and said spring to absorb energy of the forward motion of said carrier assembly.

3. A vehicle for a suspended rail conveyor system comprising a driver assembly, constant speed motor means on said driver assembly for driving said vehicle, a brake shoe mounted on said driver assembly for engagement with said rail, means for operating said brake shoe, a carrier assembly, pivotally suspended from said driver assembly to permit swinging along the line of travel of said vehicle, a plunger slidably journaled on said carrier assembly and having one end terminating forward of said carrier assembly for engagement with any obstacles in the path of travel of said vehicle, a helical spring, a cable connected between one end of said spring and the other end of said plunger, a second cable connected between the other end of said spring and said brake shoe operating means, said spring biasing said plunger to an extended position forward of said carrier, whereby impact of said plunger with an obstacle in the course of travel simultaneously causes said brake shoe to stop said driver assembly and said spring to absorb energy equal to the kinetic energy of the carrier assembly when said vehicle is moving.

4. A vehicle for a suspended rail conveyor system comprising a driver assembly, constant speed motor means on said driver assembly for driving said vehicle, a brake shoe mounted on said driver assembly for engagement with said rail, means for operating said brake shoe, a carrier assembly, pivotally suspended from said driver assembly to permit swinging along the line of travel of said vehicle, a plunger slidably journaled on said carrier assembly and having one end terminating forward of said carrier assembly for engagement with any obstacles in the path of travel of said vehicle, a helical spring, a cable connected between one end of said spring and the other end of said plunger, a second cable connected between the other end of said spring and said brake shoe operating means, said spring biasing said plunger to an extended position forward of said carrier whereby impact of said plunger with an obstacle in the course of travel simultaneously causes said brake shoe to stop said driver assembly and said spring to absorb energy equal to the kinetic energy of the carrier assembly when said vehicle is moving, and switch means operable responsive to said brake shoe operating means for deenergizing said motor means.

5. A braking system for a suspended rail conveyor vehicle having a driver assembly and a carrier assembly suspended therefrom swingable along the path of travel of said vehicle, said brake system comprising means operable to stop the forward momentum of said driver assembly, means including a plunger and a spring connected to said plunger for stopping the forward momentum of said carrier assembly responsive to engagement of said plunger with an obstacle in the path of travel, and means including said spring for operating said driver stopping means responsive to the operation of said carrier stopping means.

6. A braking system for a suspended rail conveyor vehicle having a driver assembly and a carrier assembly suspended therefrom swingable along the path of travel of said vehicle, said brake system comprising a friction brake operable to engage said rail to stop the forward momentum of said driver assembly, means including a spring and a plunger for stopping the forward momentum of said carrier assembly responsive to engagement of said plunger with an obstacle in the path of travel, and means including said spring for operating said driver stopping means responsive to the operation of said carrier stopping means.

7. A braking system for a suspended rail conveyor vehicle having an electric powered driver assembly and a carrier assembly suspended therefrom swingable along the path of travel of said vehicle, said brake system comprising a friction brake operable to engage said rail to stop the forward momentum of said driver assembly, means including a spring for stopping the forward momentum of said carrier assembly responsive to engagement with an obstacle in the path of travel, means including said spring for operating said driver stopping means responsive to the operation of said carrier stopping means, and switch means actuatable by said operating means to cut off the electric power to said driver assembly.

8. A braking system for a suspended rail conveyor vehicle having an electric powered driver assembly and a carrier assembly suspended therefrom swingable along the path of travel of said vehicle, said brake system comprising a friction brake operable to engage said rail to stop the forward momentum of said driver assembly, means including a spring and a plunger for stopping the forward momentum of said carrier assembly a predetermined distance after engagement of said plunger with an obstacle in the path of travel, and means including said spring for operating said friction brake means, responsive to the operation of said carrier stopping means to stop said driver assembly said predetermined distance after engagement with an obstacle.

9. A braking system for a suspended rail conveyor vehicle having a driver assembly and a carrier assembly suspended therefrom swingable along the path of travel of said vehicle, said brake system comprising means operable to stop the forward momentum of said driver assembly, means including a spring for stopping the forward momentum of said carrier assembly a predetermined distance after engagement with an obstacle in the path of travel, and means including said spring for operating said driver stopping means responsive to the operation of said carrier stopping means to stop said driver assembly said predetermined distances after engagement with an obstacle.

10. A braking system as claimed in claim 9 comprising in addition switch means actuatable by said operating means to cut off the electric power to said driver assembly.

11. A vehicle for a suspended rail conveyor system in which said rail is fabricated of channel beams mounted with the flanges extending horizontally and electric power conductors transverse the length of said beams between said flanges, said vehicle comprising a base member, a shaft journaled on said base member, a drive wheel mounted on one end of said shaft in frictional driving engagement with the upper surface of the lower flange of said rail, a pulley on the other end of said shaft, a constant speed motor pivotably suspended from said base, a second pulley driven by said motor, a belt operably interconnecting said pulleys and maintained taut by the weight of said pivotably suspended motor, a brake shoe reciprocably disposed through an aperture in said base to engage said rail, spring means maintaining said brake shoe in disengagement from said rail, a lever pivotally mounted beneath said base for operating said brake shoe, brush means on said base in engagement with said conductors for furnishing electric power to said motor, a switch operable by said lever for interrupting electric power to said motor, a plurality of wheels rotatably mounted on said base member for guiding engagement with said rail, a U-shaped frame suspended at the ends of its legs from said base member to pivot about an axis parallel to the direction of travel of said vehicle, a support tube vertically suspended at one end from the base of said U-shaped frame to pivot about an axis perpendicular to the line of travel of said vehicle, a carrier supported at the lower end of said tube having means for holding objects to be conveyed, a horizontally disposed tube mounted on said carrier in alignment with the direction of travel of said vehicle and having its interior in communication with the interior of said support tube, a plunger journaled within said horizontal tube for slidable translation and having one end terminating in a bumper extending in front of said carrier a predetermined distance, the other end of said plunger terminating within said horizontal tube posterior to the intercommunication of said tubes, a helical spring within said vertical tube, a cable interconnecting one end of said spring and said other end of the plunger, a second cable interconnecting the other end of said spring and said lever, said spring biasing said plunger bumper to an extended position forward of said carrier, said plunger extending said spring when said bumper engages an obstacle to a length equal to said predetermined distance whereat its potential energy is equal to the kinetic energy at impact of said carrier and said lever having a moment arm to cause said brake shoe to apply sufficient friction force to stop said vehicle in said predetermined distance.

12. A vehicle for a suspended rail conveyor system in which said rail is fabricated of channel beams mounted with the flanges extending horizontally and electric power conductors transverse the length of said beams between said flanges, said vehicle comprising a base member, a shaft journaled on said base member, a drive wheel mounted on one end of said shaft in frictional driving engagement with the upper surface of the lower flange of said rail, a pulley on the other end of said shaft, a constant speed motor pivotably suspended from said base, a second pulley driven by said motor, a belt operably interconnecting said pulleys and maintained taut by the weight of said pivotably suspended motor, a brake shoe reciprocably disposed through an aperture in said base to engage said rail, spring means maintaining said brake shoe in disengagement from said rail, a lever pivotally mounted beneath said base for operating said brake shoe, brush means on said base in engagement with said conductors for furnishing electric power to said motor, a switch operable by said lever for interrupting electric power to said motor, a plurality of wheels rotatably mounted on said base member for guiding engagement with said rail, a U-shaped frame suspended at the ends of its legs from said base member to pivot about an axis parallel to the direction of travel of said vehicle, a support tube vertically suspended at one end from the base of said U-shaped frame to pivot about an axis perpendicular to the line of travel of said vehicle, a carrier supported at the lower end of said tube having means for holding objects to be conveyed, a horizontally disposed tube mounted on said carrier in alignment with the direction of travel of said vehicle and having its interior in communication with the interior of said support tube, a plunger journaled within said horizontal tube for slidable translation and having one end terminating in a bumper extending in front of said carrier, the other end of said plunger terminating within said horizontal tube posterior to the intercommunication of said tubes, a helical spring within said vertical tube, a cable interconnecting one end of said spring and said other end of the plunger, a second cable interconnecting the other end of said spring and said lever, said spring biasing said plunger bumper to an extended position forward of said carrier, said plunger extending said spring when said bumper engages an obstacle to a length whereat its potential energy is equal to the kinetic energy at impact of said carrier.

13. A vehicle for a suspended rail conveyor system in which said rail is fabricated of channel beams mounted with the flanges extending horizontally and electric power conductors transverse the length of said beams between said flanges, said vehicle comprising a base member, a shaft journaled on said base member, a drive wheel mounted on one end of said shaft in frictional driving engagement with the upper surface of the lower flange of said rail, a pulley on the other end of said shaft, a constant speed motor pivotably suspended from said base, a second pulley driven by said motor, a belt operably interconnecting said pulleys and maintained taut by the weight of said pivotably suspended motor, a brake shoe reciprocably disposed through an aperture in said base to engage said rail, spring means maintaining said brake shoe in disengagement from said rail, a lever pivotally mounted beneath said base for operating said brake shoe, brush means on said base in engagement with said conductors for furnishing electric power to said motor, a switch operable by said lever for interrupting electric power to said motor, a plurality of wheels rotatably mounted on said base member for guiding engagement with said rail, a U-shaped frame suspended at the ends of its legs from said base member to pivot about an axis parallel to the direction of travel of said vehicle, a support tube vertically suspended at one end from the base of said U-shaped frame to pivot about an axis perpendicular to the line of travel of said vehicle, a carrier supported at the lower end of said tube having means for holding objects to be conveyed, and means including a plunger on said carrier for operating said lever when said plunger engages an obstacle in front of said vehicle.

References Cited by the Examiner

UNITED STATES PATENTS

| | | | |
|---|---|---|---|
| 1,313,358 | 8/1919 | Watkins | 105—104 |
| 1,324,029 | 12/1919 | Bouche | 105—106 |
| 1,816,031 | 7/1931 | Willis | 104—93 |
| 2,212,696 | 8/1940 | Nash | 105—148 |
| 2,619,370 | 11/1952 | Leger | 104—172 X |
| 2,974,609 | 3/1961 | Bent et al. | 105—153 |
| 3,155,207 | 11/1964 | Blemly et al. | 104—93 X |
| 3,168,874 | 2/1965 | Atanasoff | 104—89 |

ARTHUR L. LA POINT, *Primary Examiner.*

F. W. MONAGHAN, *Assistant Examiner.*